(12) United States Patent
Huang et al.

(10) Patent No.: US 10,363,592 B2
(45) Date of Patent: Jul. 30, 2019

(54) METHOD FOR PREPARING METAL COMPOSITE PLATE STRIP BY ROLLING

(71) Applicant: TAIYUAN UNIVERSITY OF SCIENCE AND TECHNOLOGY, Taiyuan, Shanxi Province (CN)

(72) Inventors: Qingxue Huang, Taiyuan (CN); Lin Zhu, Taiyuan (CN); Yugui Li, Taiyuan (CN); Cunlong Zhou, Taiyuan (CN); Lifeng Ma, Taiyuan (CN); Jiang Zhang, Taiyuan (CN); Xiaogang Wang, Taiyuan (CN)

(73) Assignee: TAIYUAN UNIVERSITY OF SCIENCE AND TECHNOLOGY, Taiyuan, Shanxi Province (CN)

( * ) Notice: Subject to any disclaimer, the term of this patent is extended or adjusted under 35 U.S.C. 154(b) by 377 days.

(21) Appl. No.: 15/167,423

(22) Filed: May 27, 2016

(65) Prior Publication Data

US 2016/0271674 A1  Sep. 22, 2016

Related U.S. Application Data

(63) Continuation of application No. PCT/CN2014/000273, filed on Mar. 14, 2014.

(30) Foreign Application Priority Data

Jan. 22, 2014  (CN) .......................... 2014 1 0028975

(51) Int. Cl.
| | |
|---|---|
| B21B 1/38 | (2006.01) |
| B21H 8/00 | (2006.01) |
| B23K 9/18 | (2006.01) |
| B21D 13/04 | (2006.01) |
| B23K 11/11 | (2006.01) |
| B23K 9/025 | (2006.01) |

(52) U.S. Cl.
CPC ................ *B21D 13/04* (2013.01); *B21B 1/38* (2013.01); *B21H 8/005* (2013.01); *B23K 9/025* (2013.01);

(Continued)

(58) Field of Classification Search
CPC ........ B21D 13/04; B23K 9/025; B23K 11/11; B23K 9/18; B21H 8/005; B21B 1/38; B21B 2001/383; B21B 2001/386

(Continued)

(56) References Cited

U.S. PATENT DOCUMENTS

| | | | | |
|---|---|---|---|---|
| 4,381,590 A | * | 5/1983 | Nonnenmann | ...... B23K 1/0014 |
| | | | | 29/890 |
| 4,927,070 A | * | 5/1990 | Kretchmer | ................ B21B 1/38 |
| | | | | 228/155 |

(Continued)

FOREIGN PATENT DOCUMENTS

| | | |
|---|---|---|
| CN | 101214745 A | 7/2008 |
| CN | 102189382 A | 9/2011 |

(Continued)

OTHER PUBLICATIONS

Taiyuan University of Science and Technology, International Search Report and Written Opinion, PCT/CN2014/000273, dated Jul. 1, 2014, 8 pgs.

(Continued)

*Primary Examiner* — Sarang Afzali
*Assistant Examiner* — Darrell C Ford
(74) *Attorney, Agent, or Firm* — Morgan, Lewis & Bockius LLP

(57) ABSTRACT

A method for preparing a metal composite plate by rolling includes the following steps: 1) rolling composite surfaces of a base plate and a cladding plate, respectively, to obtain the base plate corrugation and the cladding plate corrugation for mating with each other; 2) cleaning the composite surfaces of the base plate and the cladding plate to expose the metal matrixes of the base plate and the cladding plate; 3) laminating the base plate and the cladding plate sequentially so that the base plate corrugation on the base plate and (Continued)

cladding plate corrugation on the cladding plate mate with each other, compacting, and performing welding sealing treatment to the base plate and the cladding plate to obtain a composite plate slab; and 4) rolling the composite plate slab after inspection by using a compositing machine to a desirable thickness, to obtain a metal composite plate.

7 Claims, 6 Drawing Sheets

(52) U.S. Cl.
CPC ............... *B23K 9/18* (2013.01); *B23K 11/11* (2013.01); *B21B 2001/383* (2013.01); *B21B 2001/386* (2013.01)

(58) Field of Classification Search
USPC .. 29/428, 527.1, 527.2, 527.3, 527.5, 527.7, 29/DIG. 32, 17.1, 17.3, 446, 458, 463, 29/505
See application file for complete search history.

(56) References Cited

U.S. PATENT DOCUMENTS

| | | | | |
|---|---|---|---|---|
| 5,007,225 A * | 4/1991 | Teasdale | ............... | B63B 3/20 52/783.17 |
| 5,670,264 A * | 9/1997 | Sheridan | ............... | E04B 1/78 428/594 |
| 6,096,145 A * | 8/2000 | Pandey | ............... | B23K 20/04 148/527 |
| 6,139,974 A * | 10/2000 | Atkinson | ............... | B21D 13/04 29/521 |
| 6,443,664 B1 * | 9/2002 | Horan | ............... | E02D 5/08 405/278 |
| 6,878,412 B2 * | 4/2005 | Hebeisen | ............... | C23C 4/185 29/418 |
| 2003/0064245 A1 * | 4/2003 | Vostrikov | ............... | B21B 1/163 428/685 |
| 2006/0283529 A1 * | 12/2006 | Ghosh | ............... | B21D 13/02 148/557 |

FOREIGN PATENT DOCUMENTS

| | | |
|---|---|---|
| CN | 103272842 A | 9/2013 |
| JP | 2004154837 A | 6/2004 |
| JP | 2005152998 A | 6/2005 |

OTHER PUBLICATIONS

Taiyuan University of Science and Technology, International Preliminary Report on Patentability, PCT/CN2014/000273, dated Jul. 26, 2016, 5 pgs.

* cited by examiner

METHOD FOR PREPARING METAL COMPOSITE PLATE STRIP BY ROLLING

RELATED APPLICATIONS

This application is a continuation application of PCT Patent Application No. PCT/CN2014/000273, entitled "METHOD FOR PREPARING METAL COMPOSITE PLATE STRIP BY ROLLING" filed on Mar. 14, 2014, which claims priority to Chinese Patent Application No. 201410028975.5, entitled "METHOD FOR PREPARING METAL COMPOSITE PLATE STRIP BY ROLLING," filed on Jan. 22, 2014, both of which are hereby incorporated by reference in their entirety.

TECHNICAL FIELD

The present invention relates to the technical field of preparation of a metal composite plate/strip, in particular to a method for preparing a slab by mating a corrugated composite surface of a base plate with a corrugated composite surface of a clapping plate, and preparing a metal plate/strip by rolling.

BACKGROUND OF THE INVENTION

Metal composite plate or strip refers to a plate or strip by compositing another metal plate or strip onto a layer of metal to achieve the effect of resource saving and cost reduction without reducing the effect in use (anti-corrosion performance, mechanical strength, etc.). With the technology of metal composite material, the respective advantage of each of constituent element material can be exerted, to achieve optimum allocation of each of constituent element material, save valuable metallic material, achieve required performance which the single metal cannot meet. Metal composite plate or strip is mainly used in various industries such as anti-corrosion, pressure vessel manufacture, electricity build, petrification, pharmaceuticals, light industry and automobile etc. For the compositing method, generally there are compositing method by explosion and compositing method by metal pressure processing.

The compositing method by explosion involves compactly welding the dissimilar metal plates together by using the high energy produced by explosion, which can achieve the composition of metals which have a great difference in performance and has the strong interface binding force. However the composite by this method has smaller size and poor shape and lower yield. Furthermore, the high energy impact of explosion affects metal structure and greatly influences the environmental pollution.

The compositing method by pressure processing refers to that the distance of contact surfaces of dissimilar metals affected by deforming force during plastic deformation approaches to the thick of an atom to form a number of bonding point, so as to diffuse to form steady metallurgical bonding. Process for slab and interface compositing mechanism are main factors constraining the quality and yield of composite metal plate/strip. Rolling compositing is the most studied method among pressure processing method, comprising hot rolling, cold rolling, non-isothermal rolling and asymmetrical rolling etc. However rolling has lower compositing energy, there is great difference of material mechanical property between dissimilar metals. The bonding interface is more complex than that in explosion compositing, wherein a bonding surface of composite slab by casting may easily produce bubble and lard crack and so on. Selection of the brazing flux for brazing compositing slab greatly affects the interface bonding of different metals and results in cracking. So how to get steady interface bonding of dissimilar metals, high quality precision, broad product scope, and high compositing efficiency are the urgent problems to be solved.

SUMMARY

The present invention is directed to provide a method for preparing a metal composite plate/strip (or clad plate/strip) by rolling composite surfaces in a manner of corrugation-mating, in order to solve the technical problem of poor bonding of the composite interfaces during the composite plate preparation.

A method for preparing a metal composite plate/strip by rolling comprises the following steps:

1) Respectively rolling the composite surfaces of a base plate and a cladding plate to obtain the base plate corrugation and the cladding plate corrugation for mating with each other;

2) Cleaning the composite surfaces of the base plate and the cladding plate to expose the metal matrixes;

3) Sequentially laminating the base plate and the cladding plate so that the base plate corrugation on the base plate and cladding plate corrugation on the cladding plate mate with each other, compacting, welding and sealing, to obtain a composite plate slab;

4) Rolling the qualified composite plate after inspection by using a compositing machine to a desirable thickness, to obtain a composite plate/strip.

Wherein the process of compacting, welding and sealing in step 3) is: feeding the base plate and the cladding plate of which the corrugated surfaces mesh with each other to a press for a compaction, packaging and welding with a vertical plate by first performing spot welding around the laminated composite plate slab then using submerged-arc welding.

Wherein the step 4) comprises performing pickling on the qualified composite slab after inspection, and then performing cold rolling, to obtain a composite plate, and then trimming, leveling or straightening, and segmenting.

Wherein the process of compacting, welding and sealing in step 3) further comprises: drilling three holes at an end of the welded composite plate slab, inserting pipes and hermetically welding the connecting end of the pipes with the slab, filling nitrogen through the pipes at two sides to replace the original air with air leakage checking, closing the two pipe orifices, and then vacuuming from the center hole and closing off the pipe orifice thereof, to obtain a composite slab.

Wherein the step 4) comprises feeding the qualified composite plate slab after inspection to a heating furnace, heating to a rolling temperature, rolling in a compositing machine to obtain a composite plate, and trimming, leveling or straightening, and segmenting.

Wherein the base plate corrugation and cladding plate corrugation are distributed on the base plate and the cladding plate along the rolling direction; or the base plate corrugation and cladding plate corrugation are distributed on the base plate and the cladding plate along the axial direction of rolls.

Wherein the corrugated section shapes of the base plate and the cladding plate are circular arc-shaped, oval or sinusoidal, the corrugation height of the composites surface of the cladding plate and the base plate is 1%-90% of the thickness of the cladding plate.

Wherein rolling the composite surface of the cladding plate to obtain arc-shaped corrugation in step 1) comprises rolling the cladding plate into a whole corrugated cladding plate mating with the composite surface of the base plate, and the metal deformation resistance of the whole corrugated cladding plate is greater than that of the base plate; the corrugated section shape of the whole corrugated cladding plate and the base plate is circular arc-shaped, oval, sinusoidal, triangular, trapezoid or rectangular; the corrugation height of the whole corrugated cladding plate is 10%-70% of the thickness of the cladding plate; and the corrugation height of the composite surface of the base plate is 10%-70% of the thickness of the cladding plate Wherein a lower cladding plate is laminated at the lower part of the base plate, and an upper cladding plate is laminated at the upper part of the base plate, to obtain a three-layer plate structure in step 3). Or both the base plate and the cladding plate consist of two plates, and the four plates are laminated according to a sequence of cladding plate, base plate, anti-sticking agent, base plate and cladding plate to obtain a four-layer plate structure in step 3); and step 4) further comprises separating, trimming, performing heat treatment, leveling or straightening, and reeling up.

The present invention has the following advantages and effects:

1. The binding force between the base plate and cladding plate is increased by meshing force between the base plate corrugation and cladding plate corrugation;
2. The differences of dissimilar metal plastic performance is eliminated by the bonding of the whole corrugated cladding plate and the toothed surface of the base plate;
3. Contact area between the base plate and the cladding plate and bonding strength of the metal layers is increased by said process for slab, and the compositing efficiency is improved because cracking phenomenon of the base plate and cladding plate during rolling is avoided;
4. Degree of oxidation of the composite interface is reduced by vacuuming in the composed slab, and composite strength of the composite interfaces is increased;
5. The method for preparing a metal composite plate/strip by rolling in a manner of corrugated composite surface meshing has simple process, lower energy consumption, and high compositing quality and yield.

Figure 1:
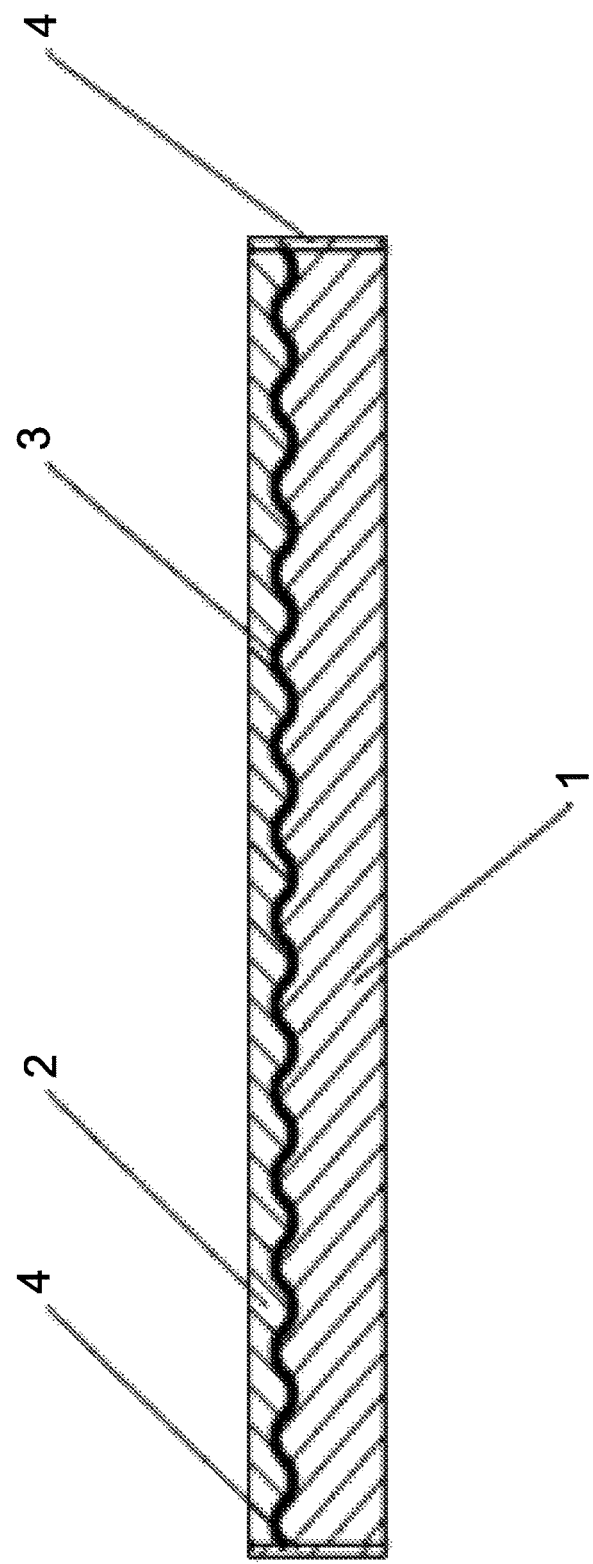
FIG. 1 is a schematic sectional view of a composite plate in which the bonding surface of a base plate and a cladding plate at a width direction is circular arc-shaped corrugation.

BRIEF DESCRIPTION OF REFERENCE NUMERALS 1, 5, 8, 11, 14, 14'—base plate;
2, 6, 9, 9', 12, 12', 15, 15'—cladding plate
4—vertical plate;
3,7—circular arc-shaped corrugation;
10, 10'—oval arc-shaped corrugation;
13, 13'—triangular corrugation;
16, 16'—sinusoidal corrugation.

DETAILED DESCRIPTION OF THE EMBODIMENTS

The present invention will be further described in detail with reference to the drawings and the embodiments. It should be understood that the concrete embodiments described herein are only used to illustrate the present invention, but not used to limit the present invention.

Embodiment 1: Preparation of Stainless Steel-Carbon Steel One-Side Composite Plate, as Shown in FIG. 1

Figure 6:
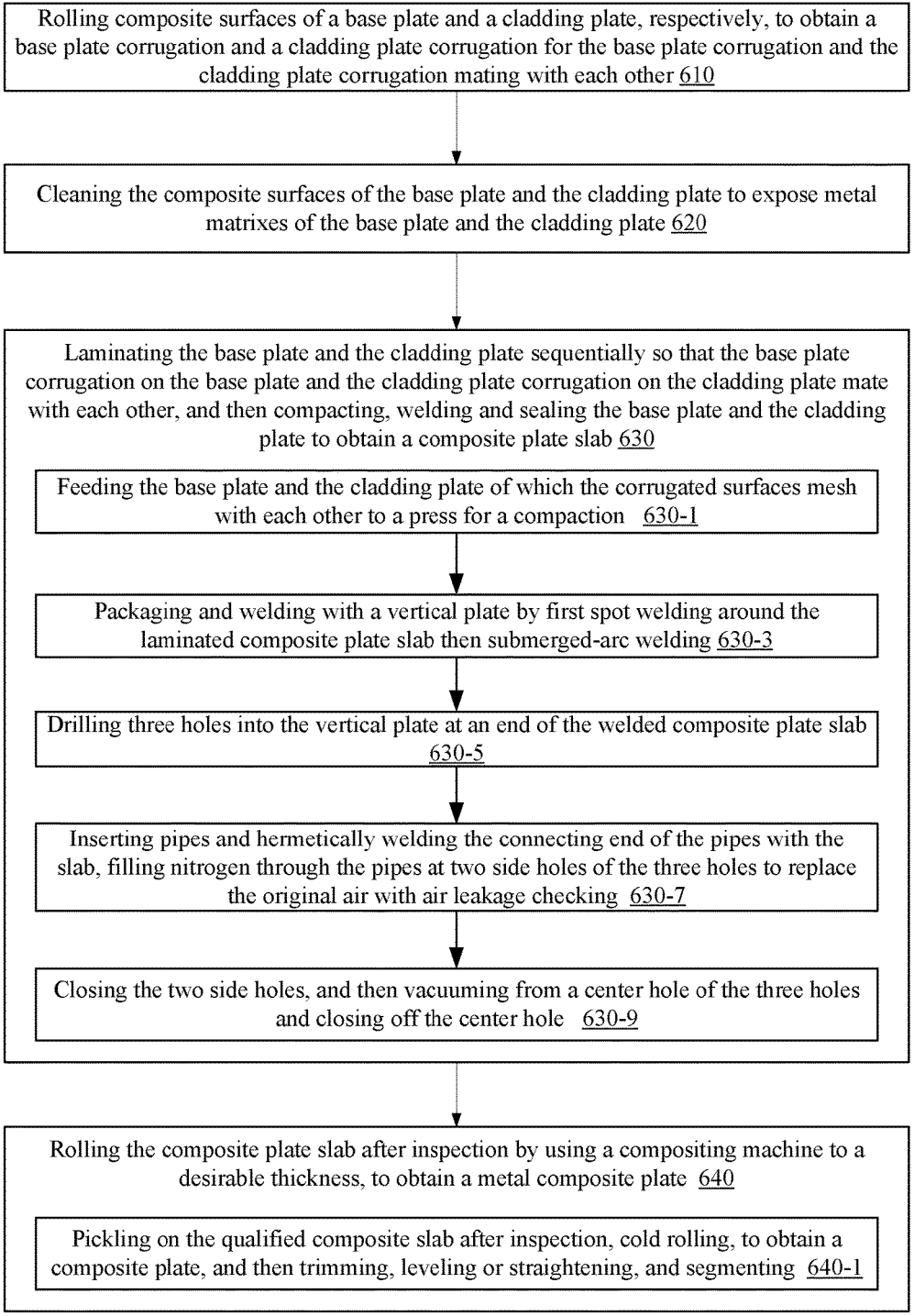
FIG. 6 is a flow chart illustrative of a process of preparing a metal composite plate by rolling according to the present invention.

Process for composite slab: combining for a slab with a selected Q345B carbon steel plate and a 304 stainless steel plate according to a proportion of 3:1, wherein the carbon steel plate has a size of 120 mm (thickness)×1500 mm (width)×3000 mm (length) and is used as base plate 1, the stainless steel plate has a size of 40 mm (thickness)×1500 mm (width)×3000 mm (length) and is used as cladding plate 2, and a sealing vertical plate 4 has a thickness of 15 mm; respectively rolling (610, FIG. 6) on a composite surface of the base plate 1 and a composite surface of the cladding plate along a width direction to obtain circular arc-shaped corrugations 3 for mating with each other, wherein the width of the arc-shaped is 5 times of the height of the arc-shaped, the height of the circular arc-shaped corrugation is 20 mm, and the circular arc-shaped corrugation is continuously distributed along a width direction; cleaning (620, FIG. 6) the corrugated surfaces of the rolled carbon steel base plate and the stainless steel cladding plate; laminating (630, FIG. 6) the carbon steel base plate 1 and the stainless steel cladding plate 2 so that the corrugated surfaces of the carbon steel base plate 1 and the stainless steel cladding plate 2 mesh with each other; feeding (630-1, FIG. 6) it to a press for a compaction; encapsulating (630-3, FIG. 6) with a carbon steel plate of 15 mm thick around the laminated composite plate slab and welding by first spot welding and then submerged-arc welding, drilling (630-5, FIG. 6) three holes at an end of the welded composite plate slab, inserting (630-7, FIG. 6) pipes and hermetically welding the connecting end of the pipes with the slab, filling nitrogen through the pipes at two sides to replace the original air with air leakage checking, closing (630-9, FIG. 6) the two pipe orifices, and then vacuuming from the center hole and closing off the pipe orifice thereof, to obtain a composite slab with a thickness of 160 mm.

Preparing composite plate: feeding the qualified composite plate slab after inspection to a heating furnace, heating to 1300° C., arranging the corrugation of the composite plate slab along axial direction of rolls, rolling (640, FIG. 6) in a compositing machine to obtain a thin plate of 8 mm, and then trimming, straightening and segmenting.

Figure 2:
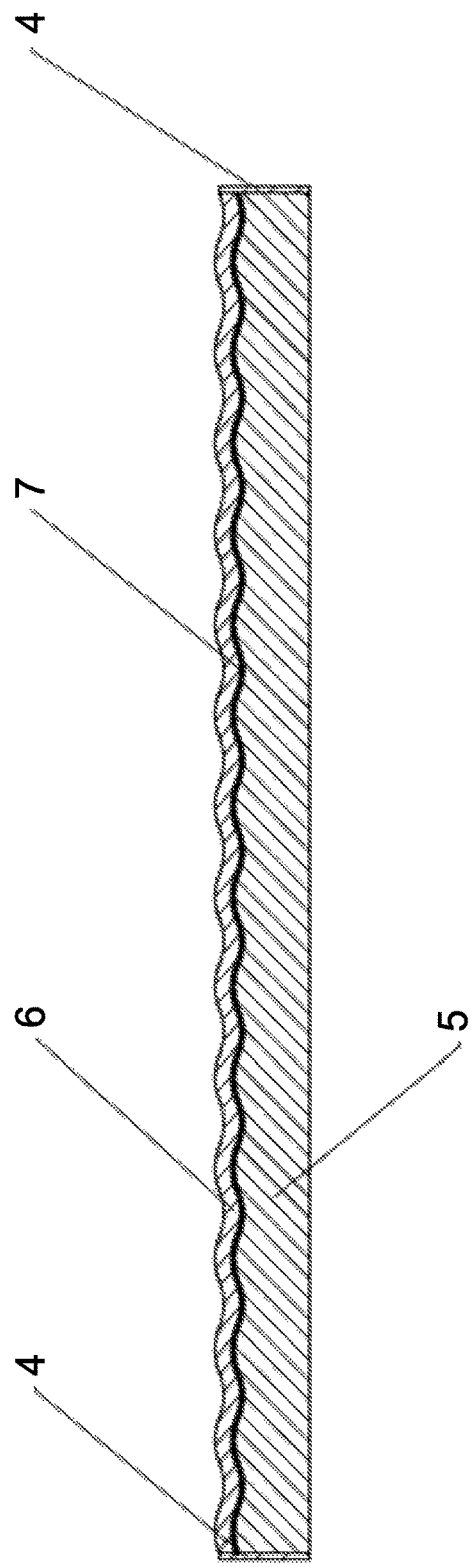
FIG. 2 is a schematic sectional view of a composite plate in which the bonding surface of a base plate and a whole corrugated cladding plate is circular arc-shaped corrugation.

Embodiment 2: Preparation of Titanium Steel-Carbon Steel One-Side Composite Plate, as Shown in FIG. 2

Process for composite slab: combining for a slab with a selected Q345R carbon steel plate and a TC4 titanium steel plate according to a proportion of 4:1, wherein the carbon steel plate has a size of 160 mm (thickness)×1500 mm (width)×3000 mm (length) and is used as base plate 5, the titanium steel plate has a size of 40 mm (thickness)×1500 mm (width)×3000 mm (length) and is used as cladding plate 6, and a sealing vertical plate 4 has a thickness of 15 mm; rolling the titanium steel cladding plate 6 into a whole circular arc-shaped corrugated plate, wherein the width of the arc-shaped is 5 times of the height of the arc-shaped, arc-shaped corrugated height is 20 mm, and the arc-shaped is continuously distributed along a length direction; rolling the composite surface of the carbon steel base plate 5 along a length direction to obtain circular arc-shaped corrugation 7 for mating with the composite surface of the titanium steel cladding plate 6; cleaning the corrugated surfaces of the rolled carbon steel base plate 5 and the titanium steel cladding plate 6; laminating the carbon steel base plate 5 and the whole corrugated titanium steel cladding plate 6 so that the corrugated surfaces of the carbon steel base plate 5 and the titanium steel cladding plate 6 mesh with each other; feeding it to a press for a compaction; encapsulating with a carbon steel plate of 15 mm thick around the laminated composite plate slab and welding by first spot welding and then submerged-arc welding, drilling three holes at an end of the welded composite plate slab, inserting pipes and hermetically welding the connecting end of the pipes with the slab, filling nitrogen through the pipes at two sides to replace the original air with air leakage checking, closing the two pipe orifices, and then vacuuming from the center hole and closing off the pipe orifice thereof, to obtain a composite slab with a thickness of 200 mm.

Preparing composite plate: feeding the qualified composite plate slab after inspection to a heating furnace, heating to 1200° C., arranging the corrugation of the composite plate slab along rolling direction, rolling in a compositing machine to obtain a thin plate of 20 mm, and then trimming, straightening and segmenting.

For the whole corrugated cladding plate, metal deformation resistance $\sigma_I$ thereof and metal deformation resistance $\sigma_{II}$ of the base plate should meet the relationship of $\sigma_I > \sigma_{II}$.

Figure 3:
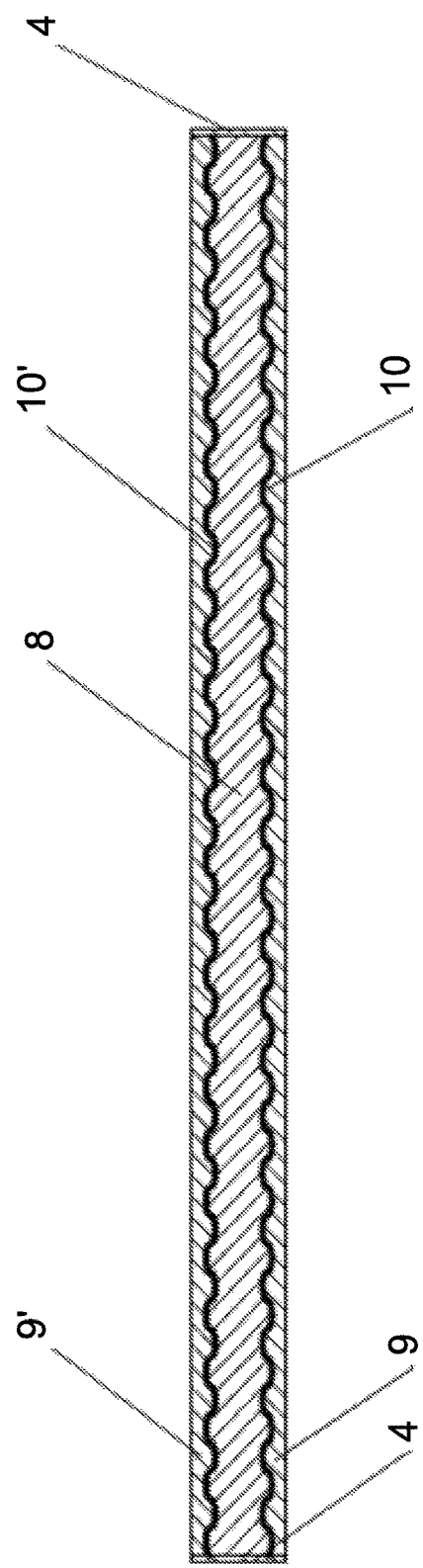
FIG. 3 is a schematic sectional view of a three-layer composite plate in which the bonding surfaces of an upper cladding plate, a base plate and a lower cladding plate are oval arc-shaped corrugation.

Embodiment 3: Preparation of Nickel Steel-Carbon Steel-Nickel Steel Two-Side Composite Plate, as Shown in FIG. 3

Processing for composite slab: combining for a slab with a selected N6 nickel steel plate, a Q234R carbon steel plate and a N6 nickel steel plate according to a proportion of 1:3:1, wherein the carbon steel plate has a size of 120 mm (thickness)×1500 mm (width)×3000 mm (length) and is used as base plate 8, the nickel steel plate has a size of 40 mm (thickness)×1500 mm (width)×3000 mm (length) and two nickel steel plates are respectively used as lower cladding plate 9 and upper cladding plate 9', and a sealing vertical plate 4 has a thickness of 15 mm; respectively rolling the composite surface of the carbon steel base plate 8 and the composite surface of the nickel steel cladding plate 9, 9' along a width direction to obtain oval arc-shaped corrugations 10, 10' for mating with each other, wherein the width of the arc-shaped is 6 times of the height of the arc-shaped, the height of the circular arc-shaped corrugation is 20 mm, and the circular arc-shaped corrugation is continuously distributed along a length direction; cleaning the corrugated surfaces of the rolled carbon steel base plate and the nickel steel cladding plate; laminating the lower cladding plate 9, the base plate 8 and the upper cladding plate 9' so that the corrugated surfaces of the carbon steel base plate 8 and nickel steel cladding plates 9, 9' mesh with each other; feeding it to a press for a compaction; encapsulating with a carbon steel plate of 15 mm thick around the laminated composite plate slab and welding by first spot welding and then submerged-arc welding, drilling three holes at an end of the welded composite plate slab, inserting pipes and hermetically welding the connecting end of the pipes with the slab, filling nitrogen through the pipes at two sides to replace the original air with air leakage checking, closing the two pipe orifices, and then vacuuming from the center hole and closing off the pipe orifice thereof, to obtain a composite slab with a thickness of 200 mm.

Preparing composite plate: feeding the qualified composite plate slab after inspection to a heating furnace, heating to 1250° C., arranging the corrugation of the composite plate slab along rolling direction, rolling in a compositing machine to obtain a thin plate of 10 mm, and then trimming, straightening and segmenting.

Figure 4:
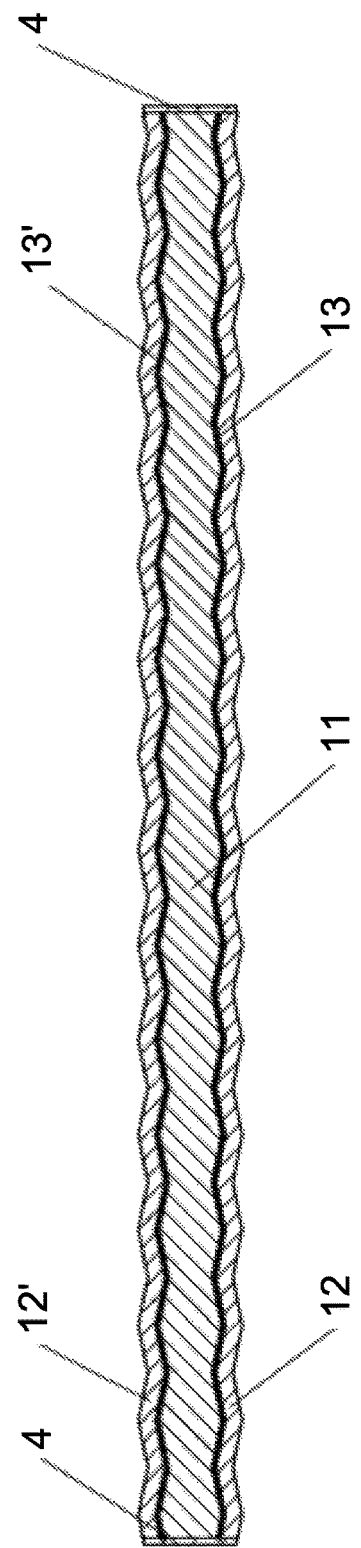
FIG. 4 is a schematic sectional view of a three-layer composite plate in which the bonding surfaces of a whole upper corrugated cladding plate, a base plate and a whole lower corrugated cladding plate are triangular corrugation.

Embodiment 4: Preparation of Copper Plate-Aluminum Plate-Copper Plate Two-Side Composite Plate, as Shown in FIG. 4

Process for composite slab: combining for a slab with a selected T3 copper plate, a LY2 aluminum plate and a T3 copper plate according to a proportion of 1:3:1, wherein the aluminum plate has a size of 60 mm (thickness)×800 mm (width)×2000 mm (length) and is used as base plate 11, the copper plates has a size of 20 mm (thickness)×800 mm (width)×2000 mm (length) and two copper plates are respectively used as upper cladding plate 12 and lower cladding plate 12', and a sealing vertical plate 4 has a thickness of 15 mm; rolling the composite surface of the base plate 11 along a length direction to obtain triangular corrugations 13, 13' for mating with a composite surface of the copper plate base plate 12, 12', and rolling the copper plate base plate 11 into a whole triangular corrugated plate, wherein the width of the triangular corrugation is 10 times of the height of the triangular corrugation, the height of the triangular corrugation is 20 mm, and the triangular corrugations 13, 13' is continuously distributed along a length direction; and cleaning the corrugated surfaces of the rolled aluminum plate and the copper plate; laminating the lower whole corrugated copper plate-cladding plate 12, the aluminum plate-base plate 11 and the upper whole corrugated copper plate-cladding plate 12' so that the corrugated surfaces of the aluminum plate-base plate 11 and the copper plate-cladding plates 12, 12' mesh with each other; feeding it to a press for a compaction; encapsulating with a carbon steel plate of 15 mm thick around the laminated composite plate slab and welding by first brazing and then submerged-arc welding, to obtain a composite slab with a thickness of 100 mm.

Preparing composite plate: pickling (640-1, FIG. 6) on the qualified composite slab after inspection, and then performing cold rolling, to obtain a composite plate of mm, and then trimming, performing heat treatment, leveling and segmenting.

Figure 5:
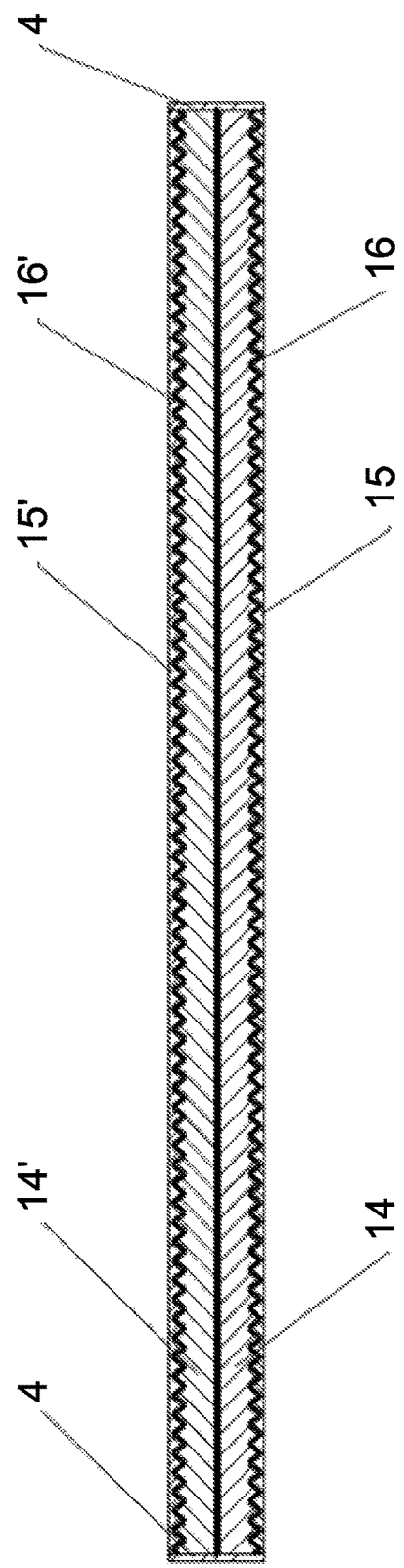
FIG. 5 is a schematic sectional view of a four-layer composite plate in which the bonding surfaces of the two-base plates and two-cladding plates are sinusoidal corrugation.

Embodiment 5: Preparation of Stainless
Steel-Carbon Steel Plate One-Side Composite Plate,
as Shown in FIG. 5

Process for composite slab: combining for a slab with a selected Q235B carbon steel plate and a 316L stainless steel plate according to a proportion of 4:1, wherein two Q235B carbon steel plates have a size of 80 mm (thickness)×1000 mm (width)×4000 mm (length) and are used as base plates, two stainless steel plates have a size of thickness 20 mm (thickness)×1000 mm (width)×4000 mm (length) and are used as cladding plates, and a sealing plate 4 has a thickness of mm; respectively rolling the composite surfaces of the Q235B carbon steel base plates 14, 14' and the 316L stainless steel cladding plates 15, 15' along a length direction to obtain sinusoidal corrugations 16, 16' for mating with each other, wherein the sinusoidal corrugation height is 20 mm, and the sinusoidal corrugations 16, 16' are continuously distributed along a length direction; cleaning the corrugated surfaces of the rolled stainless steel cladding plate and the carbon steel base plate; laminating the four plate materials according to a sequence of "stainless steel+carbon steel+anti-sticking agent+carbon steel+stainless steel" so that the corrugated surfaces of the stainless steel plate and the carbon steel plate mesh with each other; feeding it to a press for a compaction, and then performing spot welding, to connecting all the plates; and first performing brazing around the laminated composite plate slab with a carbon steel plate 4 of 15 mm thick then using submerged-arc welding for packaging welding, drilling three holes at each of the ends of the symmetry composite surfaces of the welded composite plate slab, inserting pipes and hermetically welding the connecting end of the pipes with the slab, filling nitrogen through the pipes at two side to replace the original air with air leakage checking, closing the two pipe orifices, and then vacuuming from the center hole and closing off the pipe orifice thereof, to obtain a composite slab with a thickness of 200 mm.

Preparing composite plate: feeding the qualified composite plate slab after inspection to a heating furnace, heating to 1300° C., arranging the corrugation of the composite plate slab along rolling direction, rolling in a compositing machine to obtain a stainless steel carbon steel composite plate of 6 mm, and then trimming, performing heat treatment, leveling and reeling up to obtain a one-side stainless steel carbon steel composite plate/strip of 3 mm.

Base plate corrugation and cladding plate corrugation are preferably continuously and uniformly arranged on the base plate and the cladding plate. Base plate corrugation and cladding plate corrugation are respectively distributed on the base plate and the cladding plate along the rolling direction; To solve the problem of inconsistent width, the base plate corrugation and cladding plate corrugation are respectively distributed on the base plate and the cladding plate along the axial direction of rolls. The section shape of the corrugation may be triangular, trapezoidal, rectangular, circular arc-shaped, oval or sinusoidal. The height of the corrugation may be 1%-90% of the thickness of the cladding plate. When a whole corrugated cladding plate is used, corrugation height of the whole corrugated cladding plate is 10%-70% of the thickness of the cladding plate; and the corresponding corrugation height of the base plate composite surface is also 10%-70% of the thickness of the cladding plate.

What is claimed is:

1. A method for preparing a metal composite plate by rolling, comprising:
   1) rolling composite surfaces of a base plate and a cladding plate, respectively, to obtain a base plate corrugation and a cladding plate corrugation for the base plate corrugation and the cladding plate corrugation mating with each other;
   2) cleaning the composite surfaces of the base plate and the cladding plate to expose metal matrixes of the base plate and the cladding plate;
   3) laminating the base plate and the cladding plate sequentially so that the base plate corrugation on the base plate and the cladding plate corrugation on the cladding plate mate with each other, and then compacting, welding and sealing the base plate and the cladding plate to obtain a composite plate slab, further comprising:
   feeding the base plate and the cladding plate of which the corrugated surfaces mesh with each other to a press for a compaction;
   packaging and welding with a vertical plate by first spot welding around the laminated composite plate slab then submerged-arc welding;
   drilling three holes into the vertical plate at an end of the welded composite plate slab;
   inserting pipes and hermetically welding the connecting end of the pipes with the slab, filling nitrogen through the pipes at two side holes of the three holes to replace the original air with air leakage checking;
   closing the two side holes, and then vacuuming from a center hole of the three holes and closing off the center hole; and
   4) rolling the composite plate slab after inspection by using a compositing machine to a desirable thickness, to obtain a metal composite plate, further comprising:
   pickling on the qualified composite slab after inspection, cold rolling, to obtain a composite plate, and then trimming, leveling or straightening, and segmenting.

2. The method for preparing a metal composite plate by rolling according to claim 1, wherein the step 4) further comprises feeding the composite plate slab after inspection to a heating furnace, heating to a rolling temperature, rolling in a compositing machine to obtain a composite plate, and then trimming, leveling or straightening, and segmenting.

3. The method for preparing a metal composite plate by rolling according to claim 1, wherein the base plate corrugation and the cladding plate corrugation are distributed on the base plate and the cladding plate along the rolling direction in step 1); or the base plate corrugation and cladding plate corrugation are distributed on the base plate and the cladding plate along the axial direction of rolls.

4. The method for preparing a metal composite plate by rolling according to claim 1, wherein shapes of the base plate corrugation and the cladding plate corrugation are circular arc-shaped, oval or sinusoidal, and a height of the cladding plate corrugation and the base plate corrugation is 1%-90% of the thickness of the cladding plate.

5. The method for preparing a metal composite plate by rolling according to claim 1, wherein the process of rolling the composite surface of the cladding plate to obtain arc-shaped corrugation in step 1) comprises rolling the cladding plate into a whole corrugated cladding plate mating with the composite surface of the base plate, and a metal deformation resistance of the whole corrugated cladding plate is greater than that of the base plate; the corrugated section shape of the whole corrugated cladding plate and the base plate is circular arc-shaped, oval, sinusoidal, triangular, trapezoid or rectangular; the corrugation height of the whole corrugated cladding plate is 10%-70% of the thickness of the cladding plate; and the corrugation height of the base plate composite surface is 10%-70% of the thickness of the cladding plate.

6. The method for preparing a metal composite plate by rolling according to claim 1, wherein a lower cladding plate is laminated at the lower part of the base plate, and an upper cladding plate is laminated at the upper part of the base plate, to obtain a three-layer plate structure.

7. The method for preparing a metal composite plate by rolling according to claim 1, wherein both the base plate and the cladding plate consist of two plates, and the four plates are laminated together according to a stack of cladding plate, base plate, anti-sticking agent, base plate and cladding plate to obtain a four-layer plate structure in step 3); and step 4) further comprises separating, trimming, performing heat treatment, leveling or straightening, and reeling up.

* * * * *